No. 681,308. Patented Aug. 27, 1901.
P. GEEN.
ARTIFICIAL FISHING BAIT.
(Application filed Nov. 12, 1900.)
(No Model.)

Witnesses.
Alfred J. Budd.
John J. Saunders.

Inventor.
Philip Geen
By,
Hughes & Young.
Attorneys.

UNITED STATES PATENT OFFICE.

PHILIP GEEN, OF RICHMOND, ENGLAND.

ARTIFICIAL FISHING-BAIT.

SPECIFICATION forming part of Letters Patent No. 681,308, dated August 27, 1901.

Application filed November 12, 1900. Serial No. 36,233. (No model.)

*To all whom it may concern:*

Be it known that I, PHILIP GEEN, residing at 83 Mount Ararat, Richmond, in the county of Surrey, England, have invented certain new and useful Improvements in Artificial Fishing-Baits; and I do hereby declare the following to be a full, clear, and exact description of the invention, such as will enable others skilled in the art to which it appertains to make and use the same.

This invention relates to improvements in artificial fishing-baits, and has for its object to provide a bait or lure of the "spinning" type the peculiar shape of which shall cause such artificial bait to closely resemble a natural live bait both in appearance and motion as it is drawn through the water, a further object of the invention being to provide means for instantaneously releasing the flight of hooks with which the bait is provided from their held-down or inoperative position and causing them to assume their operative position when the bait is seized by a fish.

The annexed sheet of illustrative drawings and the following description set forth in detail the manner in which I proceed to carry my invention into practical effect.

Figure 1:
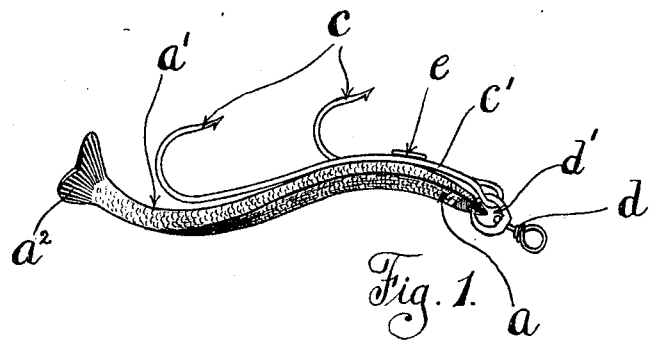
Figure 2:
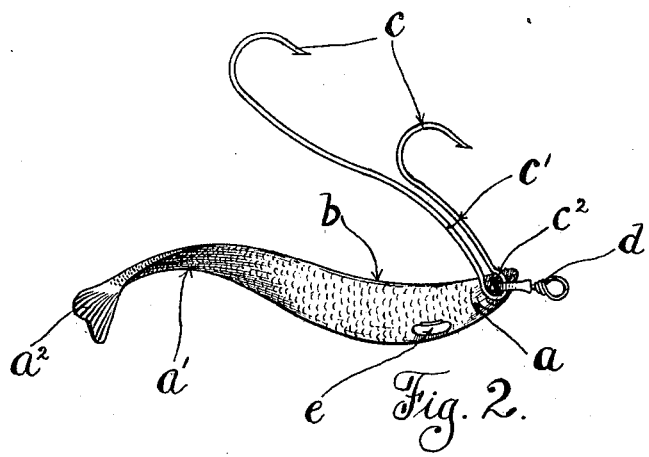
Figure 3:

In the said drawings, Figure 1 is an under side view of a bait formed in accordance with my invention, the hooks being shown in their held-down or inoperative position, Fig. 2 being a perspective view of the bait with the hooks shown in their released or operative position, while Fig. 3 is an enlarged sectional view of a detail of the invention shown independently.

The body of the bait is of undulating shape, the head $a$ forming a convex curve to about midway of the body, where the latter is given a concave curve, as at $a'$, to the tail. The said tail $a^2$ is brought somewhat downward out of alinement with the back line $b$ of the bait and is given a slight twist, so as to cause it to be at an angle to the said body, as shown. By forming the body of the bait in the manner described the bait when drawn through the water is caused to spin in a peculiarly life-like manner and so constitute a deadly lure for fish.

The bait may be colored in any suitable manner and the usual scales and characteristics of a fish formed upon such bait.

$c$ represents the flight of hooks with which the spinning bait is furnished, the said hooks having a common shank $c'$ of resilient metal, which is bent into circular form at $c^2$ and the two ends brought into an approximate parallel line with one another, the said shank having previously been passed through the eye $d'$ of the line-attaching swivel $d$ in order to attach the flight of hooks to the bait. The shank aforesaid, which from its shape and the material composing it constitutes a spring, is so curved as to correspond to the curves of the bait.

Upon the bait, near the head thereof, I provide a catch $e$, having a flanged top, beneath which the parallel portions of the spring-shank $c'$ take, so as to be held in position thereby. When a fish seizes the bait, the two parallel portions of the spring-shank $c'$ are caused to spring apart, thereby releasing the hooks from their held-down position upon the fish (which is necessary for the proper spinning of the bait) and allowing them to operate effectually upon the fish.

What I claim as my invention, and desire to secure by Letters Patent, is—

1. In improvements in artificial fishing-baits, the combination with an undulating body having an upwardly-set and angular tail end; of the hook-shank bent into a circular eye and to form two parallel spring parts; and a catch upon the bait, said catch having a flanged top beneath which the parallel portions of the hook-shank take and are normally held, substantially as specified.

2. In improvements in artificial fishing-baits the combination of an undulated body having a downwardly and sidewise inclined tail portion; with a spring-shank which is passed through the line-attaching swivel and bent into an eye, the ends of said shank being brought alongside one another in an approximate parallel position and a catch on said body, said catch having a flanged top beneath which said parallel ends of the shank are normally held, substantially as specified.

In testimony whereof I hereunto affix my signature in presence of two witnesses.

PHILIP GEEN.

Witnesses:
A. J. BUDD,
H. A. MARSHALL.